United States Patent [19]
Tani

[11] Patent Number: 5,471,454
[45] Date of Patent: Nov. 28, 1995

[54] OPTICAL HEAD HAVING SEMICONDUCTOR LASER

[75] Inventor: Naoaki Tani, Hachioji, Japan

[73] Assignee: Olympus Optical Co., Ltd., Tokyo, Japan

[21] Appl. No.: 67,954

[22] Filed: May 27, 1993

[30] Foreign Application Priority Data

May 27, 1992 [JP] Japan .................................. 4-134990

[51] Int. Cl.⁶ ..................................................... G11B 7/00
[52] U.S. Cl. ..................................... 369/100; 369/44.23
[58] Field of Search ............................ 369/44.11, 44.14, 369/44.18, 44.23, 44.24, 44.26, 44.42, 100, 112, 116, 117, 118, 122; 250/201.5

[56] References Cited

U.S. PATENT DOCUMENTS

| | | | |
|---|---|---|---|
| 5,081,617 | 1/1992 | Gelbart | 369/112 |
| 5,283,778 | 2/1994 | Maeda | 369/112 |

FOREIGN PATENT DOCUMENTS

2227835  2/1989  Japan .

*Primary Examiner*—Davis L. Willis
*Assistant Examiner*—Don Wong
*Attorney, Agent, or Firm*—Stevens, Davis, Miller & Mosher

[57] ABSTRACT

In an optical head for reading information signals out of a plurality of information tracks on an optical record medium by projecting a slit-like light spot onto the optical record medium, a laser beam having a substantially elliptical cross section is passed through a stop having an aperture to shield both edge portions of the laser beam to obtain a laser beam having a uniform distribution. Then, the laser beam emanating from the stop is made incident upon a cylindrical lens have a negative power in a direction of a major axis of the laser beam to form a laser beam having a uniform distribution in a longitudinal direction. The thus obtained laser beam is projected onto the optical record medium by an objective lens such that the longitudinal direction of the slit-shaped laser beam spot is aligned with a direction substantially perpendicular to a track direction in which information tracks extend. In this manner, a plurality of information tracks are simultaneously illuminated uniformly, so that it is possible to obtain a plurality of information signals having substantially the same level.

9 Claims, 8 Drawing Sheets

FIG_3A PRIOR ART

FIG_3B PRIOR ART

FIG. 4 PRIOR ART

FIG_5A

FIG_5B

FIG_7

OPTICAL HEAD HAVING SEMICONDUCTOR LASER

BACKGROUND OF THE INVENTION

1. Field of the Invention

The present invention relates to an optical head having a semiconductor laser for use in an optical information recording and reproducing apparatus for optically recording and reproducing information on and from an optical record medium such as optical card and optical disk.

2. Description of the Related Art

Figure 1A:
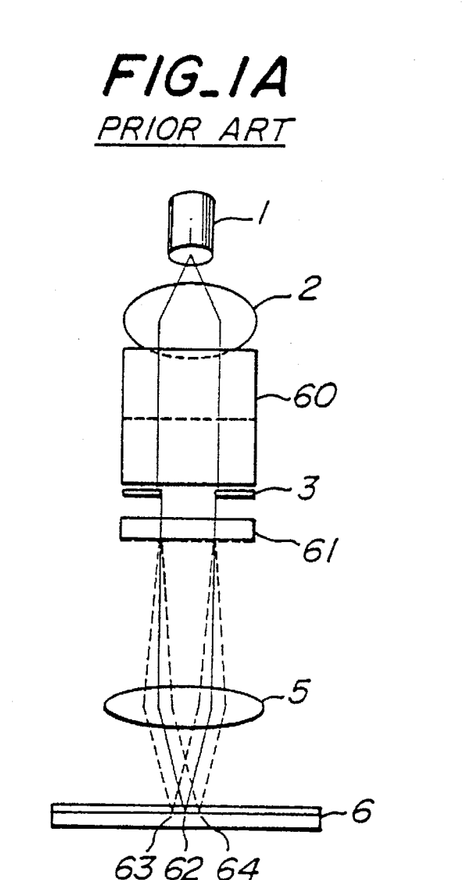
FIGS. 1A and 1B are schematic views showing a known optical head for reading a single information track by a single light beam.
Figure 1B:
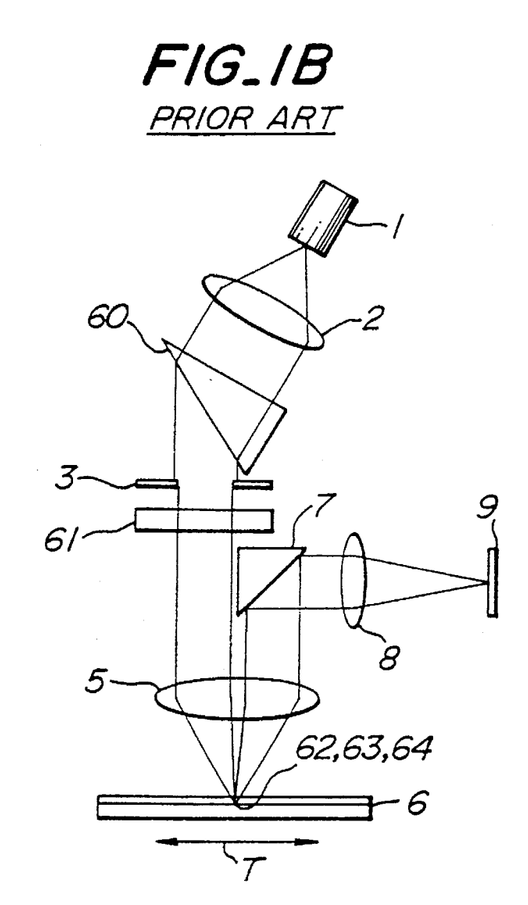

In an optical information recording and reproducing apparatus for optically recording and reproducing information on and from an optical record medium such as optical card and optical disk, speeds of the recording and reproducing are determined by a relative speed of the optical record medium and an optical head. FIGS. 1A and 1B show a known optical head in which a single light beam is made incident upon a single information track on an optical record medium. FIG. 1A is a front view showing the known optical head viewed in a track direction T in which the information tracks extend and FIG. 1B is a side view viewed in a direction perpendicular to the track direction T. In this known optical head, a tracking error is detected by a three beam method and a focusing error is detected by an off-axis method. A diverging laser light beam emitted from a semiconductor laser, i.e. a laser diode 1 is converted into a parallel light beam by a collimator lens 2. Then, the parallel light beam is converted into a substantially circular sectional beam by a shaping prism 60. The laser beam is further constricted into a light beam having a predetermined diameter by an iris 3, and then the laser light beam is made incident upon a diffraction grating 61, where zero order diffracted light beam (main beam) and +1 and −1 order diffracted light beams (sub-beam) are made incident upon an optical record medium 6 by means of an objective lens 5. In this case, the main beam and sub-beams are passed through off-axis regions of the objective lens 5 which are apart from an optical axis of the objective lens 5. Then, the main beam and sub-beams are reflected by the optical record medium 6 are made incident upon a mirror 7 through an opposite off-axis region of the objective lens 5 as clearly shown in FIG. 1B. The light beams reflected by the mirror 7 are then made incident upon a photodetector 9 through an imaging lens 8.

In the known optical head shown in FIGS. 1A and 1B, one main beam spot 62 and two sub-beam spots 63, 64 are formed on the optical record medium 6. The two sub-beam spots 63, 64 are used for a tracking servo, and only the one main beam spot 62 is utilized to record and reproduce the information on and from a single information track on the optical record medium 6. Therefore, this optical head does not provide so high speed for recording and reproducing information with respect to the optical record medium because the recording and reproducing are performed for every information tracks.

Figure 2A:
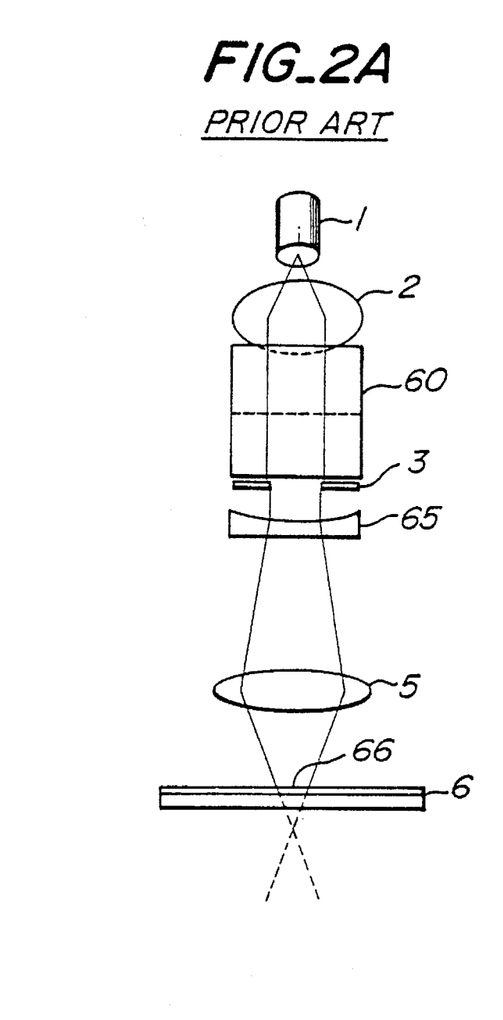
FIGS. 2A and 2B are schematic views illustrating a previously proposed optical head for reading a plurality of information tracks by a single slit-shaped light beam.
Figure 2B:
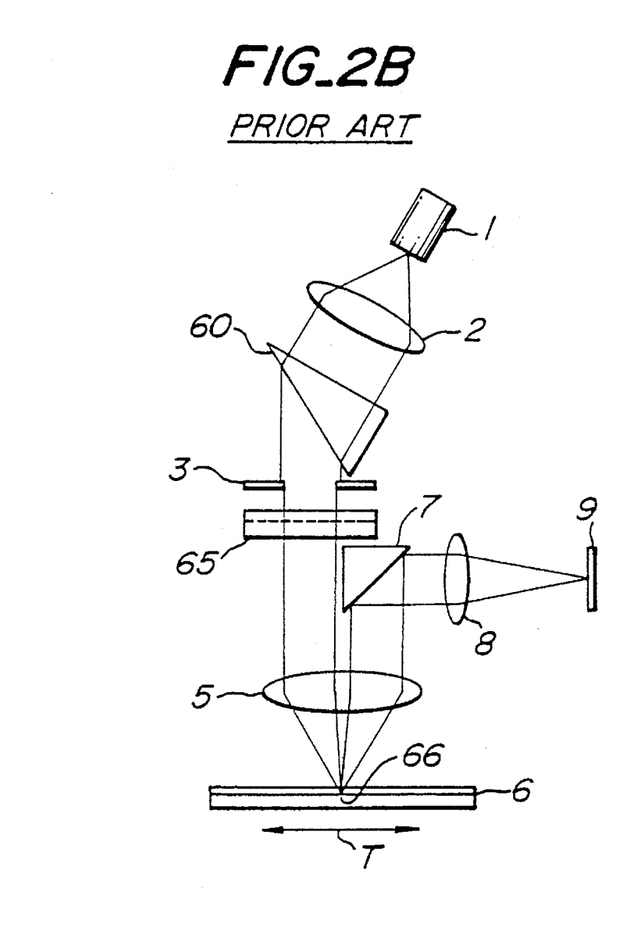

To solve such a drawback, there has been proposed another optical head illustrated in FIGS. 2A and 2B, in which the information is recorded or reproduced on and from a plurality of tracks by illuminating these tracks simultaneously. Such an optical head has been described in U.S. patent application No. 07/958,180 filed on Oct. 8, 1992. FIG. 2A is a side view showing this optical head viewed from the track direction T and FIG. 2B is a front view viewed from the direction perpendicular to the track direction T. In this known optical head, the diffraction grating 61 of the known optical head in FIGS. 1A and 1B is replaced by a cylindrical lens 65 which serves to convert the laser beam having a circular cross section into a slit-shaped laser beam. In a plane of the drawing of FIG. 2B in which the cylindrical lens 65 does not have a lens function, the light beam is not refracted by the cylindrical lens and is made incident on the objective lens 5 as a parallel light beam and is projected onto a recording surface of the optical record medium 6 as a fine light spot 66 whose size is determined by a diffraction limit of the objective lens 5. This width of the optical beam spot in this direction is substantially equal to a spot diameter obtained in the known optical head in which a single track is illuminated by a single beam.

In a plane of the drawing of FIG. 2A in which the cylindrical lens 65 has the lens function, the parallel light beam is slightly diverged by the negative power of the cylindrical lens 65 and is made incident upon the objective lens 5. Therefore, the diverged light beam is focused by the objective lens 5 at a point which is apart from the focus point of the objective lens 5, so that a length of the beam spot 66 on the optical record medium 6 becomes longer than a width of the beam spot 66 viewed in the track direction T. In this manner, the light beam spot 66 on the optical record medium 6 is of the slit-shaped one, and a direction of the length of the beam spot 66 is set to be perpendicular to the track direction T, and thus a plurality of information the tracks are simultaneously illuminated.

Figure 3A:
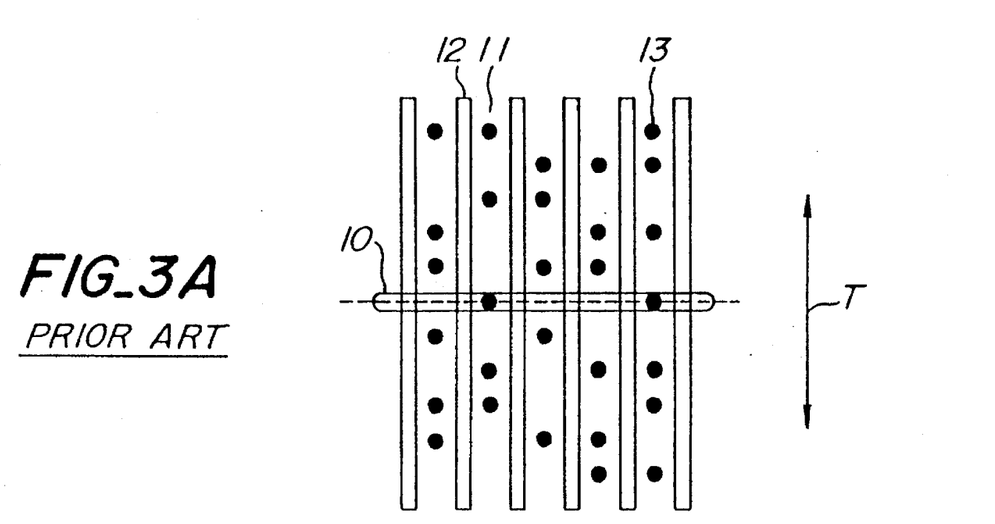
FIGS. 3A and 3B are schematic views depicting the slit-shaped light beam projected onto an optical card and a distribution of an amount of light reflected by the optical card.
Figure 3B:
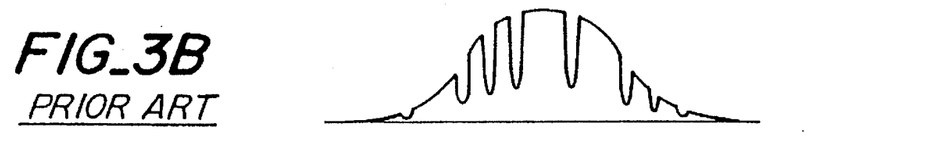

FIG. 3A is a plan view depicting the slit-shaped laser beam spot 66 formed on an optical card having a number of parallel information tracks, and FIG. 3B is a distribution of an amount of light reflected by the optical card viewed in the direction F—F of the length of the slit-shaped beam. On the optical card there are provided a number of parallel information tracks 11 and track guides 12 between successive tracks 11. In each information track 11, information pits 13 shown by black dots are formed in accordance with the content of the information. The light beam impinging upon the optical card is modulated by the track guides 12 and pits 13 and a distribution of an amount of the reflected light beam is changed as shown in FIG. 3B.

Figure 4:
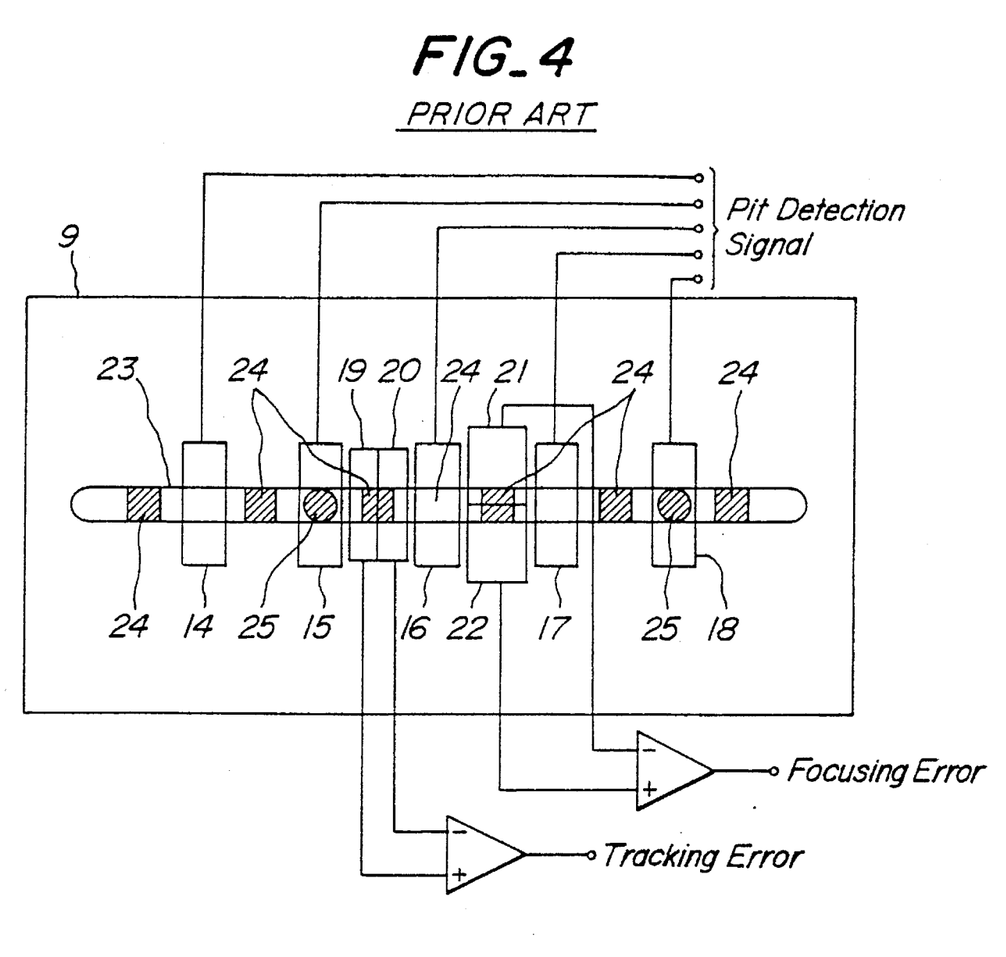
FIG. 4 is a plan view showing the slit-shaped light beam and light receiving elements of a photodetector shown in FIG. 3B.

The light beam reflected by the optical card is collected by the objective lens 5, reflected by the mirror 7 and is then made incident upon photodetector 9 by means of the imaging lens 8. Therefore, an image 23 of an optical beam spot is formed on a light receiving surface of the photodetector 9 as shown in FIG. 4. As stated above, the optical beam spot is modulated by the track guides 12 and the pits 13, so that images 24 of the track guides 12 and images 25 of the pits 13 are formed in the optical beam spot image 23. That is to say, a distribution of the image 23 formed on the photodetector 9 becomes similar to that of the light beam reflected by the optical card. In the present optical head shown in FIGS. 2A and 2B, a plurality of pit detecting light receiving elements 14 to 18 corresponding to a plurality of tracks are provided in the photodetector 9 to detect a variation of light amount due to the pit image 25. In this manner, a plurality of the tracks are read simultaneously. Furthermore, the photodetector 9 comprises tracking error detecting light receiving elements 19, 20 and focusing error detecting light receiving elements 21, 22 for receiving the images 24 of the guide tracks 12. By suitably processing output signals generated from these light receiving elements 19, 20 and 21, 22, it is possible to derive tracking error signal and focusing error signal to effect the tracking and focusing servo control such that the optical beam spot image 23 and the track guide image 24 therein come into positions shown in FIG. 4 when tracking error and focusing error are not existent.

However in the optical head shown in FIGS. 2A and 2B, the distribution in an amount of the slit-shaped light beam is not uniform over its whole length. That is to say, the distribution in an amount of the light is varied in the direction parallel with the length of the light beam and an amount of light at a central area is larger than that at peripheral areas as shown in FIG. 3B. Therefore, the level of the output signals produced by the pit detecting light receiving elements 14 to 18 is also varied. This results in that a circuit for converting the output signal into a bivalent signal is liable to be complicated. In addition, a reliability of an information signal read from tracks which situate at edge portions of the optical beam spot.

SUMMARY OF THE INVENTION

The present invention has for its object to provide a novel and useful optical head, in which the above mentioned drawbacks of the previously proposed optical head can be mitigated and a plurality of information tracks can be simultaneously read with a high reliability.

According to the invention, an optical head for reading information simultaneously from a plurality of tracks on an optical record medium by projecting a slit-shaped light spot comprises:

a semiconductor laser for emitting a laser beam having a substantially elliptical cross section;

a first optical system for converting said laser beam emitted from the semiconductor laser into a laser beam which is parallel along a track direction in which said information tracks extends and is non-parallel along a direction perpendicular to said track direction;

a second optical system including an objective lens for projecting said laser beam emanating from said first optical system onto said optical record medium as a slit-shaped laser spot such that a longitudinal direction of the slit-shaped laser spot is substantially aligned with a direction perpendicular to said track direction and a plurality of information tracks are simultaneously illuminated, said second optical system forming images of said simultaneously illuminated plurality of information tracks;

a photodetector having a plurality of light receiving elements each of which receives respective one of said images of a plurality of information tracks to derive a plurality of information signals; and a light distribution uniformizing means arranged between said semiconductor laser and said objective lens for extracting a portion of the laser beam impinging upon said objective lens, said portion having a substantially uniform distribution in an amount of light viewed in a direction which is substantially perpendicular to said track direction.

The invention is base on the recognition of the fact that the laser light beam emitted from the semiconductor laser does not have a circular cross section, but has a substantially elliptical cross section so that a distribution of an amount of laser light becomes also elliptical, and therefore when the major axis of this elliptical distribution is aligned with the direction perpendicular to the track direction, it is possible to obtain a substantial uniform distribution in an amount of light in the direction of the length of the slit-shape light beam. In the previously proposed optical head shown in FIGS. 2A and 2B, the elliptical laser beam is converted by the prism 60 into the circular laser beam, and thus the distribution of an amount of light viewed in the longitudinal direction of the slit-shaped laser beam becomes non-uniform. Moreover, in the known optical head, the major axis of the elliptical laser beam is aligned in the track direction as illustrated in FIG. 2B. Contrary to this according to the invention, the major axis of the elliptical laser beam is aligned substantially in the direction perpendicular to the track direction, so that the distribution of an amount of light the direction perpendicular to the track direction can be uniform.

In a preferable embodiment of the optical head according to the invention, said means for uniformizing the distribution in an amount of light comprises a stop having a circular aperture of a desired diameter.

DETAILED DESCRIPTION OF THE PREFERRED EMBODIMENTS

Figure 5A:
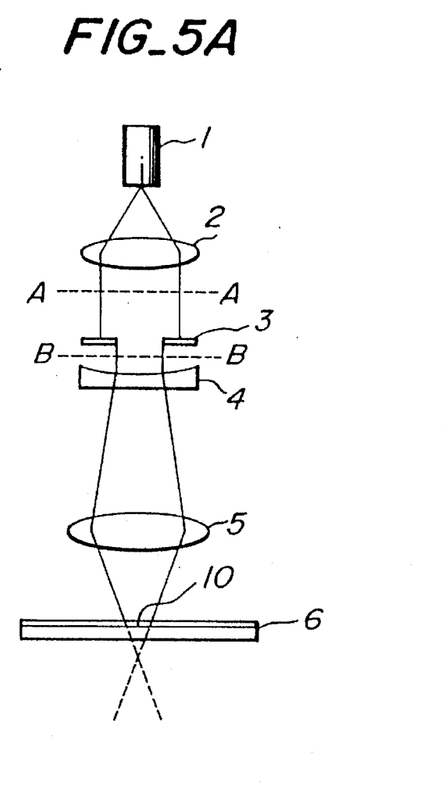
FIGS. 5A and 5B are schematic views showing an embodiment of the optical head according to the invention.
Figure 5B:
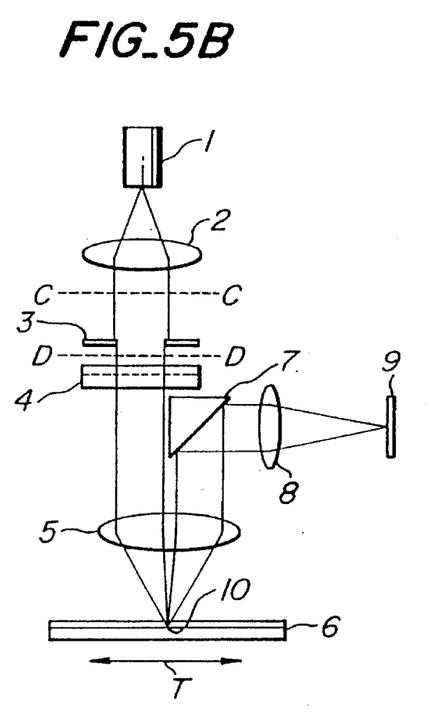

FIGS. 5A and 5B show an embodiment of the optical head according to the invention, where FIG. 5A is a side view viewed in a track direction in which information tracks on an optical record medium extend and FIG. 5B is a side view viewed in a direction perpendicular to the track direction T. In the present embodiment, a laser beam emitted from a laser diode 1 is irradiated as a slit-shaped spot onto an optical record medium 6 by means of collimator lens 2, stop 3 having a circular aperture, cylindrical lens 4 having a negative power only in the direction perpendicular to the track direction T and objective lens 5. Light reflected by the optical record medium 6 is received by a photodetector 9 through objective lens 5, mirror 7 and imaging lens 8.

In the present invention, the light source is formed by the laser diode 1. As is well known in the art, the laser light beam emitted by the laser diode 1 has an substantially elliptical cross section, and thus a light distribution of an amount of this laser beam is also substantially elliptical. In the previous proposed optical head illustrated in FIGS. 2A and 2B, the elliptical laser beam is converted into a substantially circular laser beam by the shaping prism. However in this embodiment, the elliptical laser beam emitted by the laser diode 1 is directly made incident on the stop 3 without passing through the shaping prism.

Figure 6A:
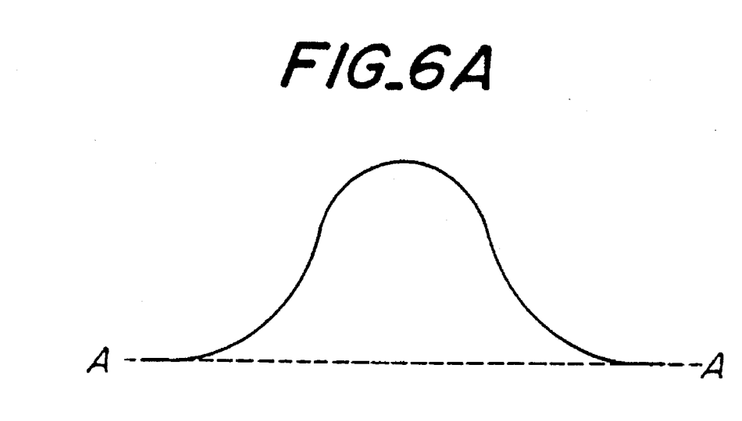
FIGS. 6A, 6B, 6C and 6D are graphs illustrating the distribution of an amount of light at various planes in FIGS. 5A and 5B.
Figure 6B:
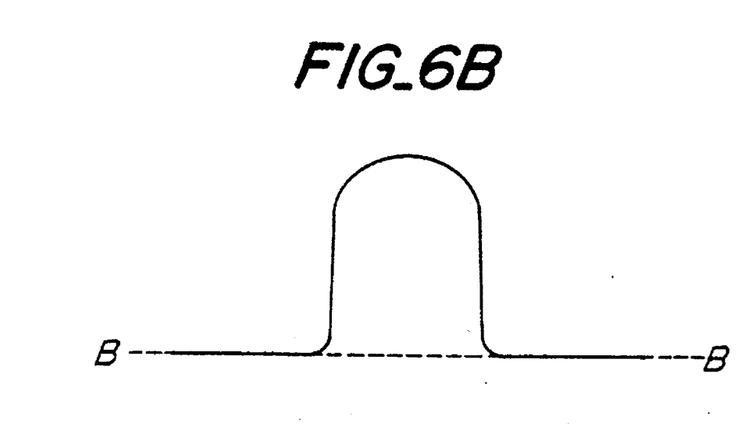
Figure 6C:
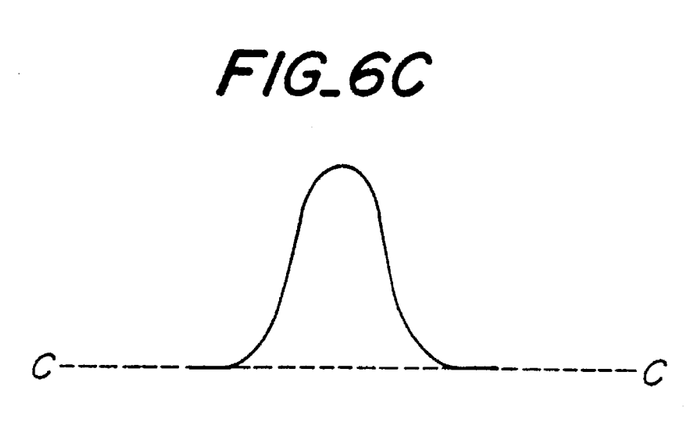
Figure 6D:
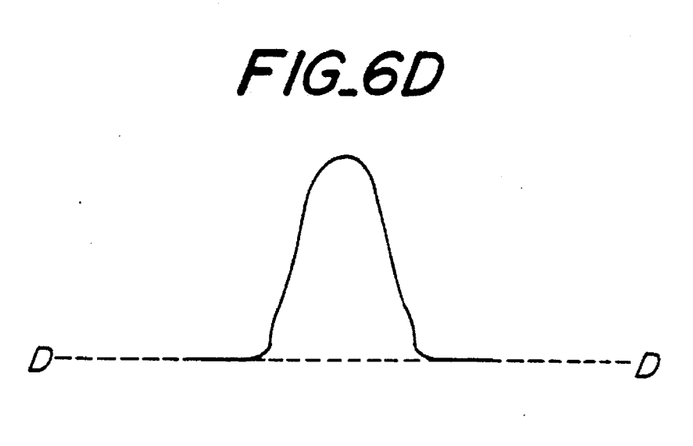

In the present embodiment, the stop 3 functions as the means for converting the elliptical distribution in an amount of light into the uniform distribution. The diameter of the stop 3 is determined such that a dimension of the laser beam viewed in a direction of the minor axis of the elliptical laser beam becomes substantially equal to a diameter of the predetermined spot size on the optical record medium as in the case of the previously proposed optical head. In general, the size of the circular aperture of the stop 3 is set to be slightly smaller than the dimension of the lateral length in a direction of the minor axis of the incident light-beam in order to prevent a loss of light. However, a dimension of the elliptical laser beam in a lateral direction parallel with the major axis is longer than the diameter of the aperture of the stop 3, so that edge portions of the laser beam is shielded by the stop and only the center portion of the laser beam having a uniform distribution in an amount of light is passed through the stop 3. Profiles of the distribution of the laser beam before and after the stop 3 are shown in FIGS. 6A to 6D. FIGS. 6A and 6B show the distribution curves on planes A—A and B—B in FIG. 5A, and FIGS. 6C and 6D depict the distribution curves on planes C—C and D—D in FIG. 5B. In this way, by providing the stop 3, the light beam has a substantially uniform distribution can be obtained in a plane of the drawing of FIG. 5A and becomes a circular shaped light beam having a light distribution approximating a Gaussian distribution in the plane of the drawing of FIG. 5B.

The light beam emanating from the stop 3 is then made incident upon the cylindrical lens 4 having a negative power in the plane of the drawing of FIG. 5A. Therefore, the laser beam emanating from the cylindrical lens 4 diverged in this plane and is made incident upon the objective lens 5. However, in the plane of the drawing of FIG. 5B, the cylindrical lens 4 has no refraction power, so that the laser beam emanating from the stop 4 is made incident upon the objective lens 5 as the parallel beam and is focused on a recording layer of the optical record medium 6. That is to say, viewed in the plane of the drawing of FIG. 5B, the laser beam is converged by the diffraction limit of the objective lens 5 into a light beam spot 10 whose dimension is substantially identical with the pit size in the information track. The dimension of the light beam spot 10 in this track direction T is called a width or lateral length.

Figure 7:
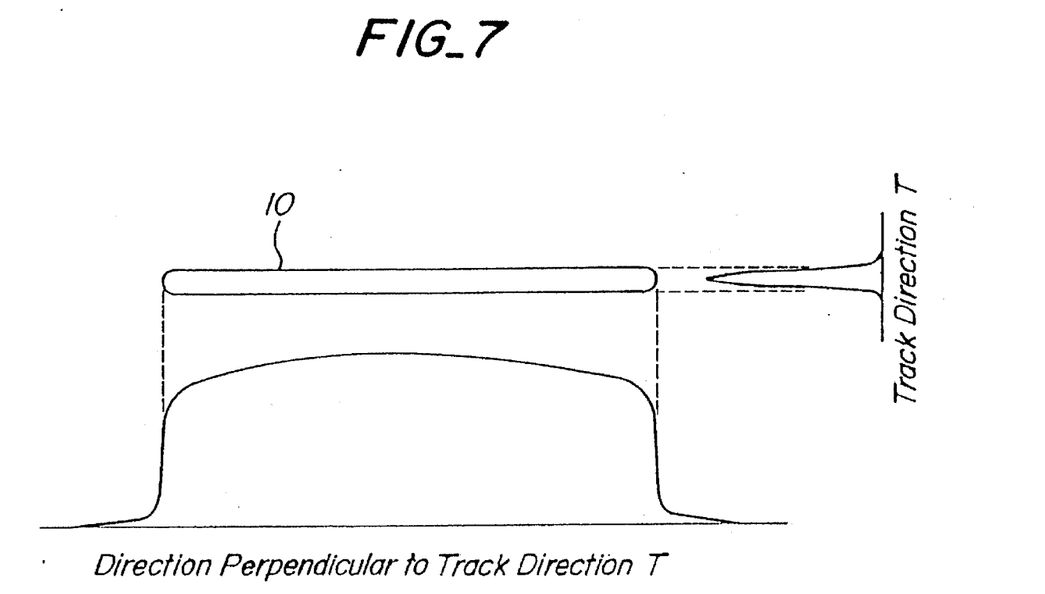
FIG. 7 is a schematic view representing a light beam spot projected onto an optical record medium and a distribution thereof in the optical head illustrated in FIGS. 5A and 5B.

In the plane of the drawing of FIG. 5A, the laser beam is diverged by the negative power of the cylindrical lens 4 and the diverged laser beam is converged by the objective lens 4 and is focused at a point far away from the recording layer of the optical record medium 6. Therefore, a longitudinal length of the laser beam spot 10 on the recording layer is sufficiently larger than the lateral length of the laser beam spot 10 viewed on the plane of the drawing of FIG. 5B. That is to say, the laser beam spot 10 projected onto the recording layer of the optical record medium 6 becomes a slit-shaped beam spot as shown in FIG. 7. Further, the distribution of an amount of the laser beam spot 10 in the longitudinal direction perpendicular to the track direction becomes substantially uniform. In other words, the edge portions of the laser beam emitted from the laser diode 1 are shielded by the stop 3, so that the uniform distribution can be attained. As illustrated in FIG. 7, in the track direction, the Gaussian type distribution is obtained.

Figure 8A:
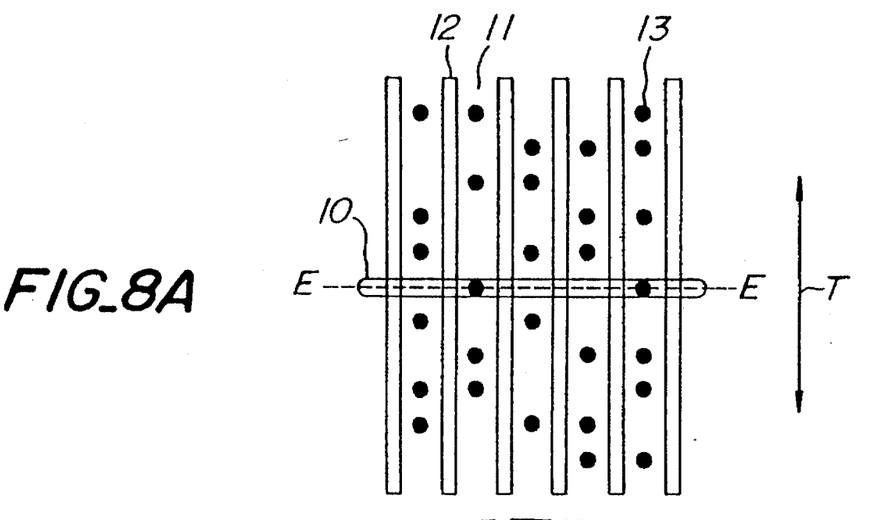
FIGS. 8A and 8B are schematic views showing the slit-shaped light beam projected onto an optical card and a distribution of an amount of light reflected by the optical card.
Figure 8B:
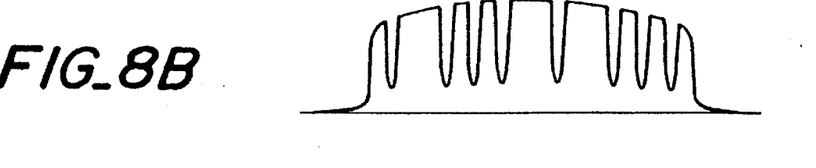

FIG. 8A is a plan view showing the laser beam spot 10 formed on the recording surface of the optical record medium and FIG. 8B denotes the distribution in an amount of the light reflected by the optical record medium viewed in the direction of the major axis E—E of the slit-shaped laser beam spot. In the present embodiment, the optical record medium 6 is formed by the optical card. On a recording surface of the optical card there are provided a number of parallel information tracks 11 and a number of track guides 12 arranged between successive tracks 11, and in respective information tracks there are formed a number of pits 13 in accordance with the information. Therefore, the laser beam reflected by the optical card is modulated depending upon the track guides 12 and pits 13.

The thus reflected light beam is collected by the objective lens 5 and is made upon the photodetector 9 by means of the mirror 7 and imaging lens 8. In this manner, an image of the light beam spot is formed on light receiving elements of the photodetector 9. It should be noted that in the present embodiment, the image of the beam spot 10 is formed on the photodetector 9 just like as the case shown in FIG. 4, and thus the manner of deriving the tracking error signal, focusing error signal and pit detection signals will be explained with reference to FIG. 4. The image 24 of the track guide 12 and the image 25 of the pit 13 are formed in the image 23 of the light beam spot because the light beam spot is modulated in accordance with the light amount by the track guide 12 and the pit 13, hence the distribution in an amount of the laser beam spot formed on the photodetector 9 becomes also uniform over a plurality of the information tracks.

In the present embodiment, the focusing error and tracking error are detected by the so called off-axis method, in which the light beam is passed through a portion of the objective lens 5, said portion situating on one side with respect to a diameter passing through the optical axis of the objective lens. On generating the focusing error, the entire image 23 of the light beam spot moves on the photodetector 9 in a direction perpendicular to a dividing line of the two divided focus error detecting light receiving elements 21 and 22. Accordingly, a focus error signal is obtained by detecting a position of the light beam spot image 23 by deriving a difference between output signals of the two light receiving elements 21 and 22. When the optical record medium 6 and the light beam spot 10 are relatively moved in the direction perpendicular to the track direction T, the track guide image 24 and the pit image 25 are moved in a direction perpendicular to the dividing line of the two divided track error detecting light receiving elements 19 and 20. Thus, a tracking error signal is obtained by detecting a position of the track guide image 24 by deriving a difference between output signals of the two divided tracking error detecting light receiving elements 19 and 20. The focusing error detecting light receiving elements 21 and 22 are disposed to prevent the pit image 25 from being caught by the light receiving elements 21 and 22 under the condition of no tracking error, the focusing error signal is not affected by the information pits.

The output signals of the pit detecting light receiving elements 14 to 18 of the photodetector 9 are changed in accordance with the pits 13 on the information tracks 12. According to the present invention, the laser beam spot 10 has the uniform distribution in the longitudinal direction, so that magnitudes of these output signals becomes substantially identical with each other. Therefore, the signal processing circuit can be constructed simply and the information signals can be simultaneously derived with a high reliability.

The invention is not limited to the embodiment as hereinbefore described, but various changes and modifications may be conceived within the scope of the invention. In the embodiment described above, the stop 3 is used as the light distribution uniformizing means, and disposed between the collimator lens 2 and the cylindrical lens 4. But, according to the invention, the stop 3 may be disposed between the cylindrical lens 4 and the objective lens 5, or the function of the stop 3 may be obtained by using the collimator lens 2 having a smaller numerical aperture. Further, the function of the stop 3 may be achieved by a cylindrical tube supporting the objective lens 5. The shape of the aperture of the stop 3 is not limited to circular, but many other shapes may be utilized as long as the same function could be attained. Furthermore, the shaping prism for converting the elliptical laser beam into the circular laser beam may be employed by suitably selecting the shape of the aperture of the stop. In addition, in the embodiment described, the cylindrical lens 4 is used, but the slit-shaped spot forming means is not limited to the cylindrical lens 4, but use may be made of a lens having different lens functions by varying a curvature or refraction index distribution on cross sections which are perpendicular to each other and pass through the optical axis, and of a mirror having different reflective functions by varying the curvature on cross sections which are perpendicular to each other and pass through the optical axis.

Moreover, the focusing error may be detected not only by the off-axis method but also by any other method such as the astigmatism method, critical angle method and knife edge method. The photodetector for detecting the focusing error may be provided as a separated body from a photodetector for detecting the pit detection signals and tracking error signal. In the embodiment described above, a plurality of information signals are simultaneously read out of a plurality of information tracks. In addition to this, an information signal may be written on an information track by providing writing light source and optical system.

As fully described hereinbefore, according to the invention, the slit-shaped laser beam spot formed on the optical record medium has the uniform distribution in an amount of light viewed in the longitudinal length of the beam spot, and therefore when a plurality of information tracks are read out simultaneously, it is possible to obtain a plurality of information signals having substantially the same signal level. Thus, the optical record medium can be read out with a high reliability and the signal processing circuit can be made simple.

What is claimed is:

1. An optical head for reading information simultaneously from a plurality of tracks on an optical record medium by projecting a slit-shaped light spot comprising:

a semiconductor laser for emitting a laser beam having a substantially elliptical cross section;

a first optical system for converting said laser beam emitted from the semiconductor laser into a laser beam which is parallel along a track direction in which said information tracks extends and is non-parallel along a direction perpendicular to said track direction;

a second optical system including an objective lens for projecting said laser beam emanating from said first optical system onto said optical record medium as a slit-shaped laser spot such that a longitudinal direction of the slit-shaped laser spot is substantially aligned with a direction perpendicular to said track direction and a plurality of information tracks are simultaneous illuminated, said second optical system forming images of said simultaneously illuminated plurality of information tracks;

a photodetector having a plurality of light receiving elements each of which receives respective one of said images of a plurality of information tracks to derive a plurality of information signals; and a light distribution uniformizing means arranged between said semiconductor laser and said objective lens for extracting a portion of the laser beam impinging upon said objective lens, said portion having a substantially uniform distribution in an amount of light along a direction which is substantially perpendicular to said track direction, said light distribution uniformizing means comprising a stop arranged between said light source and said objective lens, wherein said stop has a circular aperture whose diameter is slightly shorter than a dimension of the elliptical laser beam along a direction of a minor axis thereof.

2. An optical head according to claim 1, wherein said semiconductor laser and first optical system are arranged such that a major axis of said elliptical laser beam emitted by said semiconductor laser is aligned with said direction perpendicular to said track direction.

3. An optical head according to claim 1, wherein said first optical system comprises a collimator lens and a cylindrical lens having a negative power along a plane perpendicular to said track direction, and said stop is arranged between said collimator lens and said cylindrical lens.

4. An optical head according to claim 3, wherein said stop is arranged such that the laser beam emanating from said first optical system is made incident upon an off-axis portion of the objective lens and a focusing error is detected by an off-axis method.

5. An optical head for reading information simultaneously from a plurality of tracks on an optical record medium by projecting a slit-shaped light spot comprising:

a laser diode for emitting a diverging laser beam;

a collimator lens for converting said diverging laser beam emitted by said laser diode into a parallel laser beam;

a cylindrical lens for converting said parallel laser beam emanating from said collimator lens into a laser beam which is parallel along a track direction in which the information tracks on the optical record medium extend and is non-parallel along a direction perpendicular to said track-direction, said parallel laser beam emanating from said collimator lens being incident on said cylindrical lens without an intervening change of direction;

an objective lens for projecting said laser beam emanating from said cylindrical lens onto the optical record medium as a slit-shaped laser spot such that a longitudinal direction of said slit-shaped laser spot is aligned with a direction substantially perpendicular to said track direction and a lateral direction of said slit-shaped laser spot is aligned substantially with said track direction, so that a plurality of information tracks on the optical record medium are illuminated simultaneously;

an imaging lens for forming images of said plurality of information tracks illuminated simultaneously; and a photodetector having a plurality of light receiving elements each of which receives a respective one of said images of said plurality of simultaneously illuminated information tracks formed by said objective lens to derive a plurality of information signals.

6. An optical head according to claim 5, wherein said diverging laser beam emitted by said laser diode has a substantially elliptical cross section.

7. An optical head according to claim 6, wherein said substantially elliptical cross section of said diverging laser beam has a major axis aligned with said direction perpendicular to said track direction.

8. An optical head according to claim 6, wherein said optical head further comprises a stop arranged between said collimator lens and said cylindrical lens for shielding both edge portions of the elliptical laser beam.

9. An optical head according to claim 5, further comprising light distribution uniformitizing means, disposed between said collimator lens and said cylindrical lens, for extracting a portion of said parallel laser beam emanating from said collimator lens, said portion having a substantially uniform distribution in an amount of light along said direction perpendicular to said track direction.

* * * * *